US012338109B2

(12) United States Patent
Liu et al.

(10) Patent No.: US 12,338,109 B2
(45) Date of Patent: Jun. 24, 2025

(54) AERIAL WORK PLATFORM AND FLOATING CONTROL SYSTEM THEREOF

(71) Applicant: HUNAN SINOBOOM INTELLIGENT EQUIPMENT CO., LTD, Hunan (CN)

(72) Inventors: Guoliang Liu, Hunan (CN); Changhui Du, Hunan (CN); Yuxiao Zhang, Hunan (CN); Angen Wu, Hunan (CN)

(73) Assignee: HUNAN SINOBOOM INTELLIGENT EQUIPMENT CO., LTD, Hunan (CN)

( * ) Notice: Subject to any disclaimer, the term of this patent is extended or adjusted under 35 U.S.C. 154(b) by 0 days.

(21) Appl. No.: 18/577,688

(22) PCT Filed: Sep. 25, 2023

(86) PCT No.: PCT/CN2023/120975
§ 371 (c)(1),
(2) Date: Jan. 8, 2024

(87) PCT Pub. No.: WO2025/035542
PCT Pub. Date: Feb. 20, 2025

(65) Prior Publication Data
US 2025/0091849 A1 Mar. 20, 2025

(51) Int. Cl.
*B66F 11/04* (2006.01)

(52) U.S. Cl.
CPC .................................. *B66F 11/044* (2013.01)

(58) Field of Classification Search
CPC ........ B66F 11/044; B66F 9/22; F15B 11/165; F15B 11/16
See application file for complete search history.

(56) References Cited

U.S. PATENT DOCUMENTS

2005/0205337 A1 9/2005 Porskrog et al.
2020/0277755 A1 9/2020 Kondo et al.

FOREIGN PATENT DOCUMENTS

CN 109973447 A * 7/2019
CN 113389761 A 9/2021
(Continued)

OTHER PUBLICATIONS

International Search Report, dated Nov. 23, 2023, for International Application No. PCT/CN2023/120975, 8 pages.

*Primary Examiner* — Karen Beck
(74) *Attorney, Agent, or Firm* — MASCHOFF BRENNAN; Michael Mauriel

(57) ABSTRACT

An aerial work platform and a floating control system thereof, the system comprising a driving mechanism, a hydraulic oil tank, a hydraulic pump, a floating control valve, a floating mechanism, a boom function valve, an actuator, and an accumulator: the floating control valve comprises a first one-way valve, a second one-way valve, a pressure reducing valve, and a logic valve; and an oil inlet of the first one-way valve serves as the oil inlet of the floating control valve, an oil outlet of the first one-way valve is connected to a pipeline connecting the accumulator, the pressure reducing valve and the logic valve, the logic valve is connected to the second one-way valve, an oil outlet of the second one-way valve serves as the feedback oil port of the floating control valve, when the hydraulic pump is a variable displacement pump, a feedback oil port of the floating control valve and a feedback oil port of the boom function valve are connected to a feedback oil port of the variable displacement pump; when the hydraulic pump is a fixed displacement pump, a feedback oil port of the floating control valve is connected to a feedback oil port of the boom
(Continued)

function valve. The invention can reduce the power loss and improve the reliability of the system.

20 Claims, 4 Drawing Sheets

(56) References Cited

FOREIGN PATENT DOCUMENTS

| | | | | |
|---|---|---|---|---|
| CN | 216430094 | U | | 5/2022 |
| CN | 218325528 | U | | 1/2023 |
| CN | 115962170 | A | | 4/2023 |
| CN | 116733798 | A | * | 9/2023 |

* cited by examiner

AERIAL WORK PLATFORM AND FLOATING CONTROL SYSTEM THEREOF

CROSS REFERENCE TO RELATED APPLICATIONS

This application is a U.S. National Phase application under 35 U.S.C. § 371 of International Application No. PCT/CN2023/120975 filed on Sep. 25, 2023, and claims priority to Chinese Patent Application No. 202311027576.2, filed with the China National Intellectual Property Administration on Aug. 16, 2023 and entitled "AERIAL WORK PLATFORM AND FLOATING CONTROL SYSTEM THEREOF", which is incorporated herein by reference in its entirety.

FIELD OF THE INVENTION

The present invention belongs to the field of floating control technologies, and in particular, relates to an aerial work platform and a floating control system thereof.

BACKGROUND OF THE INVENTION

Existing aerial work platforms generally achieve off-road performance of a chassis through chassis floating. There are usually two ways to achieve a floating function: one is passive floating controlled by a body posture, and the other is active floating with chassis floating regardless of a body position. The active floating, which does not require additional control, has higher safety than the passive floating, so common aerial work platforms use the active floating. Due to the particularity of the active floating, a floating hydraulic control system is required to provide a stable standby working pressure for a floating mechanism, so as to ensure that a body can have floating output in various postures.

At present, existing floating hydraulic control systems, as shown in FIG. 1 and FIG. 2, are implemented by controlling a load-sensitive variable displacement pump to output a constant pressure. This requires the floating hydraulic control system to continuously provide the standby working pressure for the floating mechanism. In practical applications, floating control is a large part of energy loss. At present, aerial work platforms have tended towards electric development. Therefore, this part of power loss plays a crucial role in improving the endurance of an electric product.

As shown in FIG. 1 and FIG. 2, the activation of the floating function is controlled by an electrical signal, so as to increase the standby working pressure of the load-sensitive variable displacement pump. Therefore, reliabilities of the electrical signal and a solenoid valve determine a reliability of the floating function to a great extent, which may affect overall safety.

SUMMARY OF THE INVENTION

The present invention aims to provide an aerial work platform and a floating control system thereof, so as to solve the problems of high power loss and low reliability in current floating hydraulic control systems.

The present invention solves the above technical problems by the following technical solutions: A floating control system, comprising a driving mechanism, a hydraulic oil tank, a variable displacement pump, a floating control valve, a floating mechanism, a boom function valve, and an actuator, wherein the variable displacement pump is driven by the driving mechanism, an oil inlet of the variable displacement pump is connected to the hydraulic oil tank, an oil outlet of the variable displacement pump is connected to oil inlets of the floating control valve and the boom function valve, a feedback oil port of the variable displacement pump is connected to feedback oil ports of the floating control valve and the boom function valve through feedback oil paths, the floating control valve is connected to the floating mechanism and the hydraulic oil tank, and the boom function valve is connected to the actuator and the hydraulic oil tank;

the system further comprises an accumulator, and the floating control valve comprises a first one-way valve, a second one-way valve, a pressure reducing valve, and a logic valve; and an oil inlet of the first one-way valve serves as the oil inlet of the floating control valve, an oil outlet of the first one-way valve is connected to a pipeline connecting the accumulator, an oil inlet of the pressure reducing valve and an oil inlet of the logic valve, an oil outlet of the logic valve is connected to an oil inlet of the second one-way valve, an oil outlet of the second one-way valve serves as the feedback oil port of the floating control valve, an oil outlet of the pressure reducing valve is connected to the floating mechanism, and the pipeline connecting the pressure reducing valve and the logic valve is also connected to the hydraulic oil tank.

Further, the boom function valve comprises a change-over switch valve, a change-over proportional valve, a third one-way valve, a fourth one-way valve, an overflow valve, and a first unloading valve; an oil inlet of the third one-way valve serves as the oil inlet of the boom function valve, and an oil outlet of the third one-way valve is connected to a pipeline connecting an oil inlet of the change-over proportional valve and an oil inlet of the overflow valve; an oil outlet of the change-over proportional valve is connected to a pipeline connecting an oil inlet of the fourth one-way valve and an oil return port of the change-over switch valve, and an oil outlet of the overflow valve is connected to a pipeline connecting an oil inlet of the change-over switch valve, the first unloading valve and the hydraulic oil tank; an oil outlet of the fourth one-way valve serves as the feedback oil port of the boom function valve, and the first unloading valve is also connected to the feedback oil path; and an oil outlet of the change-over switch valve is connected to the actuator.

Further, the first unloading valve is a two-way flow valve.

Further, a pressure sensor for detecting oil output pressure is further arranged at the oil outlet of the variable displacement pump.

Further, the actuator is a change-over cylinder, the change-over cylinder comprises a left change-over cylinder and a right change-over cylinder, and the left change-over cylinder and the right change-over cylinder are connected to the oil outlet of the change-over switch valve in the boom function valve respectively.

Further, the driving mechanism is a motor.

Based on the same concept, the present invention further provides a floating control system, which comprising a driving mechanism, a hydraulic oil tank, a fixed displacement pump, a floating control valve, a floating mechanism, a boom function valve, and an actuator, wherein the fixed displacement pump is driven by the driving mechanism, an oil inlet of the fixed displacement pump is connected to the hydraulic oil tank, an oil outlet of the fixed displacement pump is connected to oil inlets of the floating control valve and the boom function valve, a feedback oil port of the floating control valve is connected to a feedback oil port of the boom function valve through a feedback oil path, the floating control valve is connected to the floating mechanism and the hydraulic oil tank, and the boom function valve is connected to the actuator and the hydraulic oil tank;

the system further comprises an accumulator, and the floating control valve comprises a first one-way valve, a second one-way valve, a pressure reducing valve, and a logic valve; and an oil inlet of the first one-way valve serves as the oil inlet of the floating control valve, an oil outlet of the first one-way valve is connected to a pipeline connecting the accumulator, an oil inlet of the pressure reducing valve and an oil inlet of the logic valve, an oil outlet of the logic valve is connected to an oil inlet of the second one-way valve, an oil outlet of the second one-way valve serves as the feedback oil port of the floating control valve, an oil outlet of the pressure reducing valve is connected to the floating mechanism, and the pipeline connecting the pressure reducing valve and the logic valve is also connected to the hydraulic oil tank.

Further, the boom function valve comprises a change-over switch valve, a change-over proportional valve, a third one-way valve, a fourth one-way valve, an overflow valve, and a second unloading valve; an oil inlet of the third one-way valve serves as the oil inlet of the boom function valve, and an oil outlet of the third one-way valve is connected to a pipeline connecting an oil inlet of the change-over proportional valve, an oil inlet of the overflow valve and a first port of the second unloading valve; an oil outlet of the change-over proportional valve is connected to a pipeline connecting an oil inlet of the fourth one-way valve and an oil return port of the change-over switch valve, and an oil outlet of the overflow valve is connected to a pipeline connecting an oil inlet of the change-over switch valve, a third port of the second unloading valve and the hydraulic oil tank; an oil outlet of the fourth one-way valve serves as the feedback oil port of the boom function valve, and a second port and a fourth port of the second unloading valve are also connected to the feedback oil path; and an oil outlet of the change-over switch valve is connected to the actuator.

Further, the second unloading valve comprises a two-way flow valve and a three-way flow valve, a first port of the three-way flow valve serves as the first port of the second unloading valve, a first port of the two-way flow valve serves as the second port of the second unloading valve, second ports of the two-way flow valve and the three-way flow valve serve as the third port of the second unloading valve, and a third port of the three-way flow valve serves as the fourth port of the second unloading valve.

Based on the same concept, the present invention further provides an aerial work platform, which includes the floating control system as described above.

Beneficial Effects

Compared with the prior art, the advantages of the present invention are as follows:

In the present invention, energy is stored to the accumulator when the system is started, and the accumulator storing energy provides a stable standby pressure for the floating mechanism. After the energy of the accumulator is consumed, the variable displacement pump or fixed displacement pump is required to increase its pressure to supplement energy. Therefore, the variable displacement pump or fixed displacement pump does not need to be under a constant pressure standby condition to continuously output high pressure to provide the stable standby pressure for the floating mechanism, the intermittent energy charging mode of the variable displacement pump or fixed displacement pump greatly reduces energy consumption, which is conducive to improving the endurance of an electric aerial work platforms;

In the present invention, energy can also be stored to the accumulator when other actions are performed, which is more energy-saving than conventional methods;

The present invention can achieve automatic energy storage in the accumulator to provide a stable oil source for the floating mechanism, thereby reducing control costs and risks produced when control signals fail or control solenoid valves fail and making the system more stable and reliable;

The accumulator is used as a standby oil source for the floating mechanism, and the accumulator has faster flow and pressure responses than flow output and oil pressure increase by the variable displacement pump or fixed displacement pump, so the accumulator has faster responses under working conditions that the floating mechanism falls in pits and the like.

BRIEF DESCRIPTION OF THE DRAWINGS

In order to illustrate the technical solutions of the present invention more clearly, the accompanying drawings used in the description of the embodiments will be briefly introduced below. Apparently, the accompanying drawings in the following description are only an embodiment of the present invention, and those of ordinary skill in the art can obtain other drawings according to the accompanying drawings without any creative effort.

In the figures, 1—hydraulic oil tank, 2—load-sensitive variable displacement pump, 21—flow valve of the load-sensitive variable displacement pump, 22—cut-off valve of the load-sensitive variable displacement pump, 3—floating control valve, 31—logic valve, 32—first one-way valve, 33—second one-way valve, 34—pressure reducing valve, 4—boom function valve, 41—change-over switch valve, 42—change-over proportional valve, 43—third one-way valve, 44—two-way flow valve, 45—overflow valve, 46—fourth one-way valve, 47—three-way flow valve, 5—driving mechanism, 6—left change-over cylinder, 7—right change-over cylinder, 8—accumulator, 9—fixed displacement pump, dotted lines indicate feedback oil paths.

DETAILED DESCRIPTION OF THE EMBODIMENTS

The technical solutions in the present invention will be clearly and completely described below with reference to the accompanying drawings in the embodiments of the present invention. Apparently, the described embodiments are only some of the embodiments of the present invention, not all of them. All other embodiments obtained by those of ordinary skill in the art based on the embodiments of the present invention without any creative efforts shall fall within the scope of protection of the present invention.

The technical solutions of the present application are described in detail below by specific embodiments. The following several specific embodiments may be combined with each other, and same or similar concepts or processes may be omitted in some embodiments.

Embodiment 1

Figure 1:
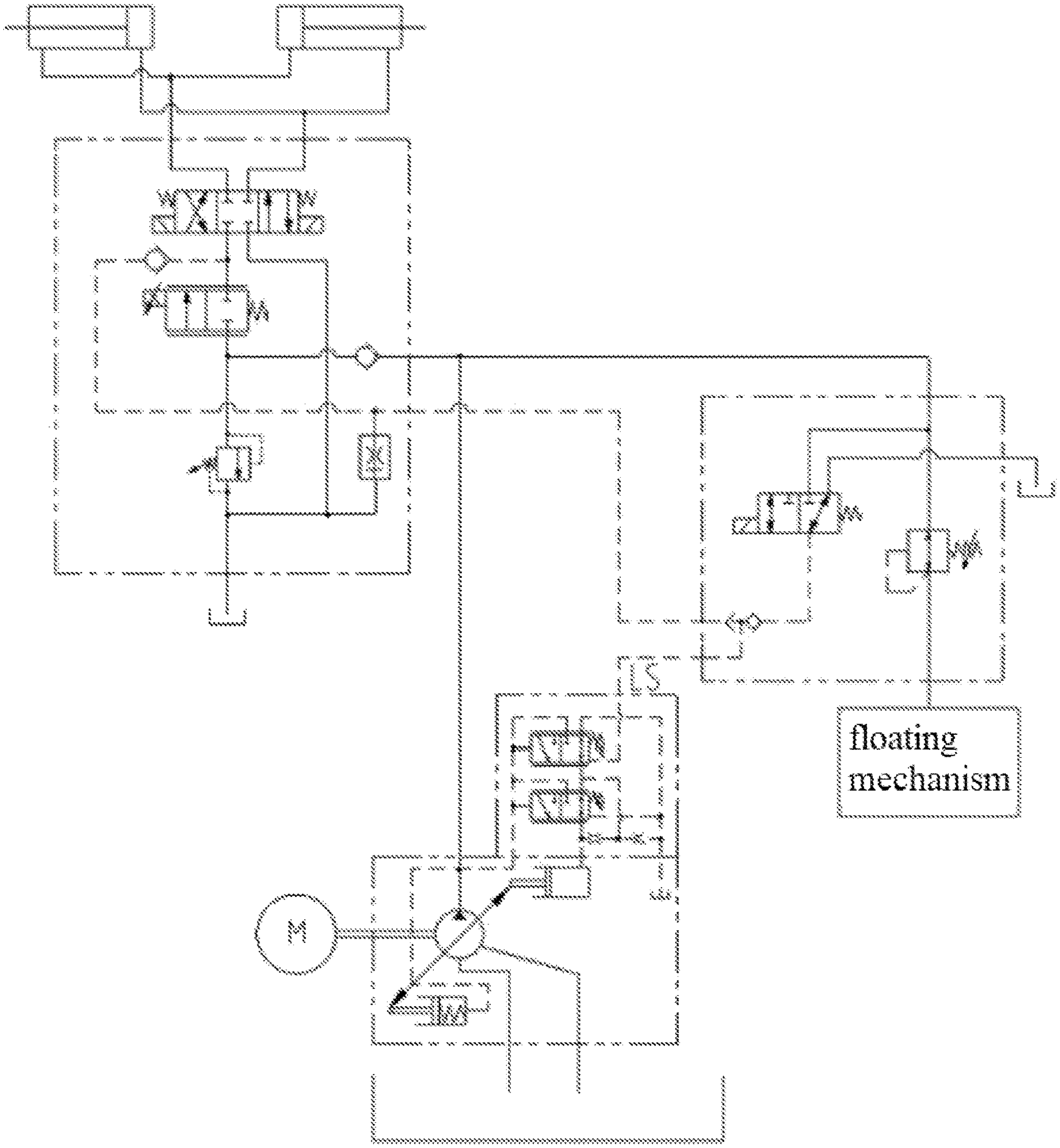
FIG. 1 is a schematic diagram of a first implementation of a floating hydraulic control system in the background of the present invention.
Figure 2:
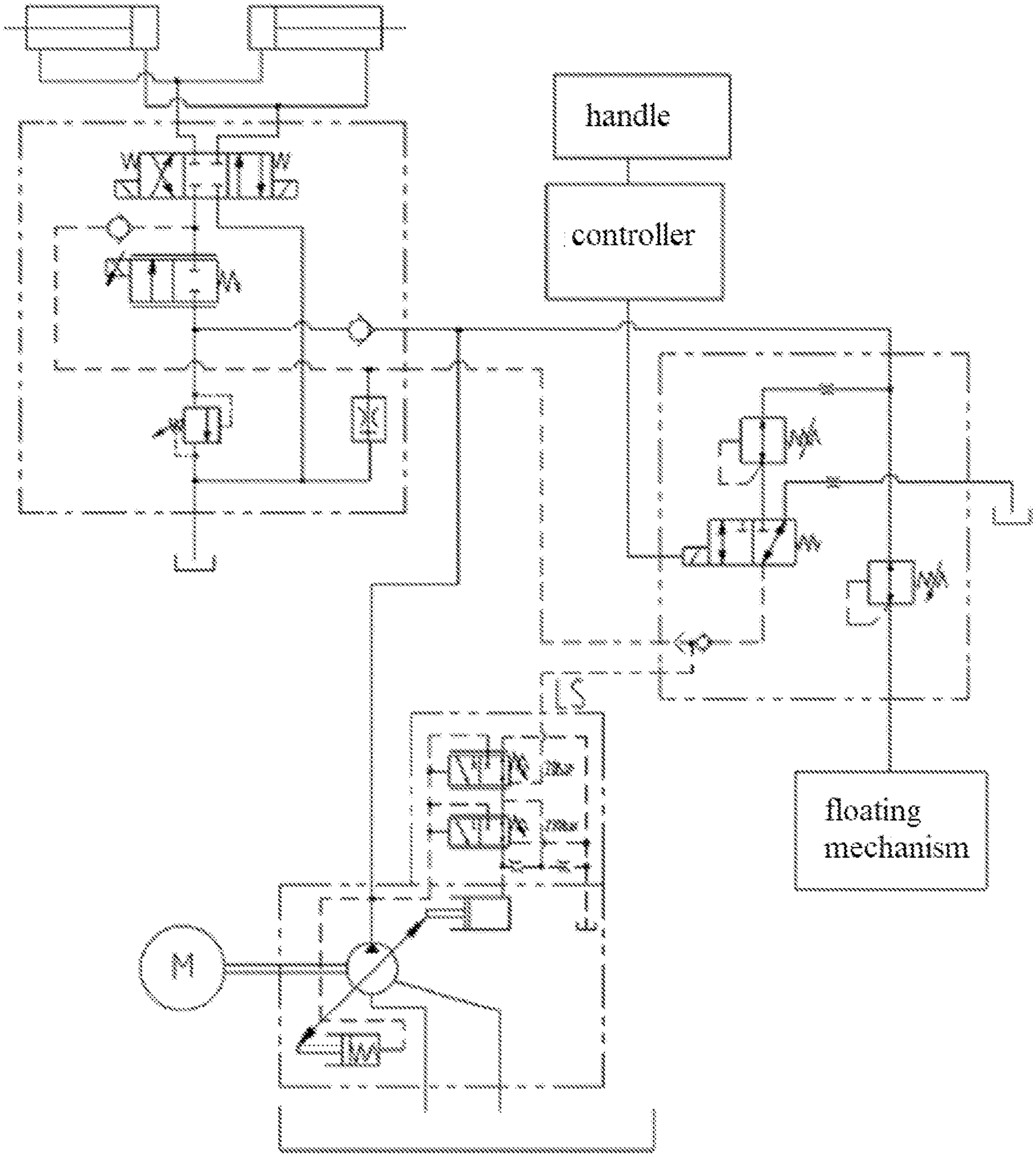
FIG. 2 is a schematic diagram of a second implementation of a floating hydraulic control system in the background of the present invention.
Figure 3:
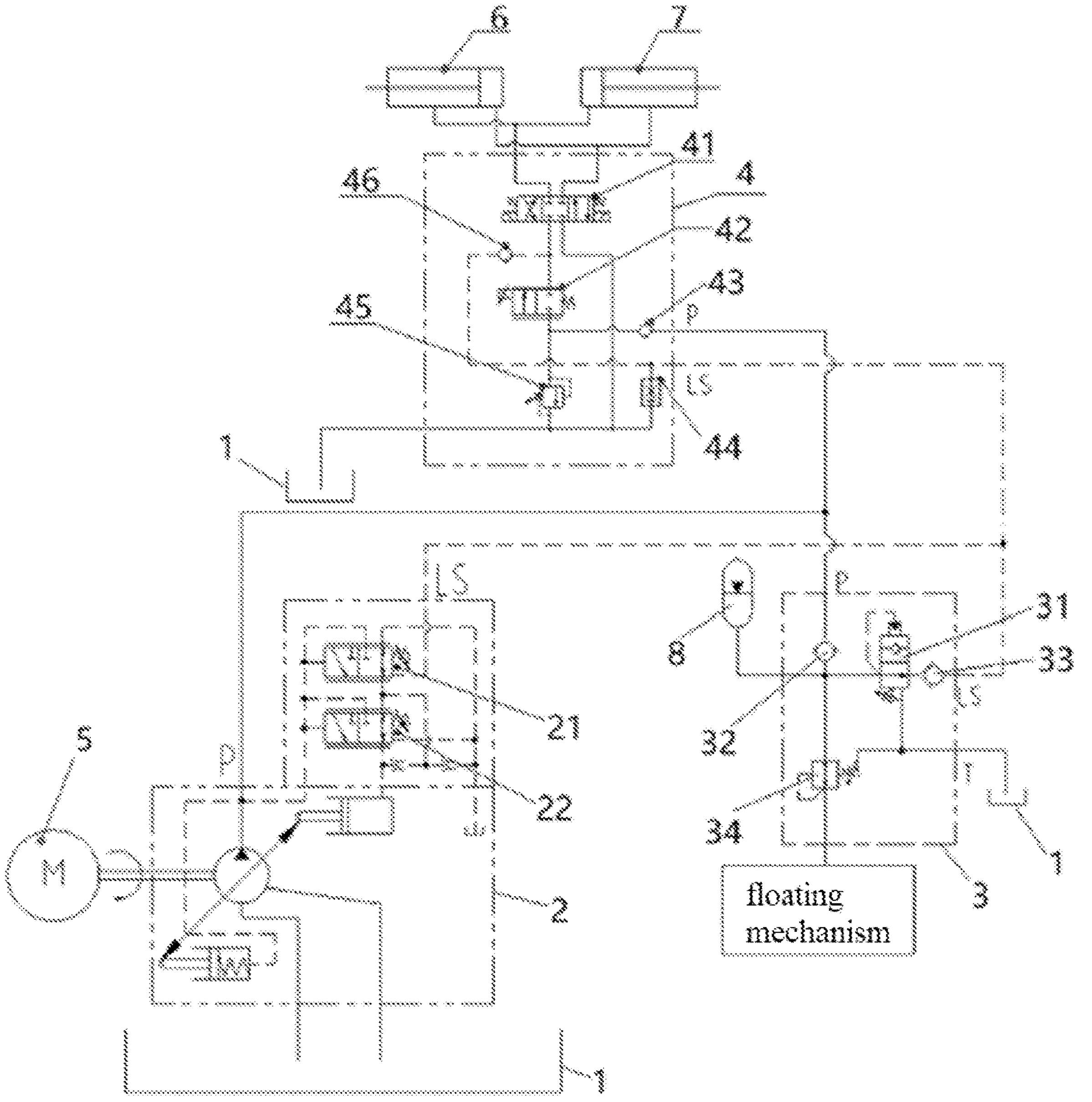
FIG. 3 is a schematic diagram of a floating control system in Embodiment 1 of the present invention.

As shown in FIG. 3, a floating control system provided in an embodiment of the present invention includes a driving mechanism 5, a hydraulic oil tank 1, a load-sensitive variable displacement pump 2, a floating control valve 3, a floating mechanism, a boom function valve 4, an actuator, and an accumulator 8. The load-sensitive variable displacement pump 2 is driven by the driving mechanism 5, an oil inlet of the load-sensitive variable displacement pump 2 is connected to the hydraulic oil tank 1, an oil outlet P of the load-sensitive variable displacement pump 2 is connected to oil inlets of the floating control valve 3 and the boom function valve 4, and feedback oil ports LS of the floating control valve 3 and the boom function valve 4 are connected to a feedback oil port LS of the load-sensitive variable displacement pump 2 through feedback oil paths; the floating control valve 3 is connected to the accumulator 8, the floating mechanism, and the hydraulic oil tank 1; and the boom function valve 4 is connected to the actuator and the hydraulic oil tank 1.

The floating control valve 3 includes a first one-way valve 32, a second one-way valve 33, a pressure reducing valve 34, and a logic valve 31; an oil inlet of the first one-way valve 32 serves as the oil inlet P of the floating control valve 3, an oil outlet of the first one-way valve 32 is connected to a pipeline connecting the accumulator 8, an oil inlet of the pressure reducing valve 34 and an oil inlet of the logic valve 31, an oil outlet of the logic valve 31 is connected to an oil inlet of the second one-way valve 33, an oil outlet of the second one-way valve 33 serves as the feedback oil port LS of the floating control valve 3, an oil outlet of the pressure reducing valve 34 is connected to the floating mechanism, and the pipeline connecting the pressure reducing valve 34 and the logic valve 31 is also connected to the hydraulic oil tank 1.

The boom function valve 4 includes a change-over switch valve 41, a change-over proportional valve 42, a third one-way valve 43, a fourth one-way valve 46, an overflow valve 45, and a two-way flow valve 44; an oil inlet of the third one-way valve 43 serves as the oil inlet P of the boom function valve 4, and an oil outlet of the third one-way valve 43 is connected to a pipeline connecting an oil inlet of the change-over proportional valve 42 and an oil inlet of the overflow valve 45; an oil outlet of the change-over proportional valve 42 is connected to a pipeline connecting an oil inlet of the fourth one-way valve 46 and an oil return port of the change-over switch valve 41, and an oil outlet of the overflow valve 45 is connected to a pipeline connecting an oil inlet of the change-over switch valve 41, the two-way flow valve 44 and the hydraulic oil tank 1; an oil outlet of the fourth one-way valve 46 serves as the feedback oil port LS of the boom function valve 4, and the two-way flow valve 44 is also connected to the feedback oil path; and an oil outlet of the change-over switch valve 41 is connected to the actuator.

In this embodiment, the driving mechanism 5 is a motor. The actuator is a change-over cylinder, the change-over cylinder includes a left change-over cylinder 6 and a right change-over cylinder 7, and the left change-over cylinder 6 and the right change-over cylinder 7 are connected to the oil outlet of the change-over switch valve 41 respectively.

When the system is started, the motor drives the load-sensitive variable displacement pump 2 to rotate, and oil from the oil outlet of the load-sensitive variable displacement pump 2 enters the floating control valve 3. Because an oil output pressure (namely, an oil pressure at the oil outlet) of the load-sensitive variable displacement pump 2 is lower than a set pressure of the logic valve 31 at this moment, the oil output pressure of the load-sensitive variable displacement pump 2 is fed back to the feedback oil port LS of the load-sensitive variable displacement pump 2 through the logic valve 31 and the feedback oil path. Because the change-over proportional valve 42 is closed, there is no feedback pressure at the feedback oil port LS of the boom function valve 4. Therefore, only the oil output pressure of the load-sensitive variable displacement pump 2 is fed back to the feedback oil port LS of the load-sensitive variable displacement pump 2. In this case, a flow valve on the load-sensitive variable displacement pump 2 is in a right working position due to the feedback pressure, the load-sensitive variable displacement pump 2 continues to output oil at a maximum flow rate, and the oil output pressure of the load-sensitive variable displacement pump 2 continues to increase. When the oil output pressure of the load-sensitive variable displacement pump 2 is greater than a nitrogen charging pressure of the accumulator 8, the oil enters the accumulator 8 for energy storage, and the rate of increase in the oil output pressure decreases. After the accumulator 8 is filled with oil, the oil output pressure starts to rapidly increase again. When the oil output pressure reaches the set pressure of the logic valve 31, the logic valve 31 changes over its direction to cut off the oil outlet of the logic valve 31, so that there is no feedback pressure at the feedback oil port LS of the load-sensitive variable displacement pump 2. At this time, the feedback oil path unloads the hydraulic oil tank 1 through the two-way flow valve 44 on the boom function valve 4. Since the pressure on the feedback oil path decreases, the flow valve on the load-sensitive variable displacement pump 2 overcomes a spring force and changes over to a left working position under the action of the oil output pressure, the oil output pressure of the load-sensitive variable displacement pump 2 enters a variable mechanism of the load-sensitive variable displacement pump 2 through the flow valve, displacement at the oil outlet of the load-sensitive variable displacement pump 2 decreases to near zero output, and the oil output pressure of the load-sensitive variable displacement pump 2 returns to a standby pressure, which is usually very low, so the power loss is very small. In the presence of the first one-way valve 32 in the floating control valve 3, the oil in the accumulator 8 can be almost maintained at a maximum pressure before the oil outlet of the logic valve 31 is cut off, without releasing pressure. In this case, the accumulator 8 serves as a standby oil source for the floating mechanism, and continues to provide stable standby pressure for the floating mechanism.

When the floating mechanism consumes the oil in the accumulator 8 to decrease the oil pressure in the accumulator 8 to the set pressure of the logic valve 31, the logic valve 31 changes over its direction to open the oil outlet of the logic valve 31, and the oil output pressure of the load-sensitive variable displacement pump 2 is fed back to the feedback oil outlet LS of the load-sensitive variable displacement pump 2. Due to the feedback pressure at the feedback oil port LS of the load-sensitive variable displacement pump 2, the flow valve 21 of the load-sensitive variable displacement pump 2 changes over its direction to the right working position under the feedback pressure to break the balance maintained at the standby pressure, the variable mechanism of the load-sensitive variable displacement pump 2 restores to the maximum flow rate, and the flow rate at the oil outlet of the load-sensitive variable displacement pump 2 increases to replenish oil for the accumulator 8. When the oil output pressure reaches the set pressure of the logic valve 31, the logic valve 31 cuts off the feedback pressure again, the feedback oil path unloads the hydraulic oil tank 1 again through the two-way flow valve 44 on the boom function valve 4, and the load-sensitive variable displacement pump 2 restores to the standby pressure state.

After the energy storage in the accumulator 8 is completed, the accumulator 8 provides a stable standby pressure for the floating mechanism, the load-sensitive variable displacement pump 2 operates in a standby state with extremely low power consumption, and continuous constant pressure standby of the load-sensitive variable displacement pump 2 is not required, so the power consumption is greatly reduced. Meanwhile, fully automatic floating control can be achieved by the system of the present invention, and any solenoid valve is not required to control the floating function, thereby greatly reducing hidden dangers caused by control signals, solenoid valves, and other factors and improving the reliability of the system.

Due to the parallel connection between the oil inlet of the floating control valve 3 and other actions (such as change-over, traveling, and braking), when the other actions are performed, the pressure at the oil inlet of the floating control valve 3 increases, and after the pressure exceeds the nitrogen charging pressure of the accumulator 8, oil is replenished to the accumulator 8. Meanwhile, the first one-way valve 32 and the pressure reducing valve 34 can directly provide pressure to the floating mechanism. After the actions stop, the oil pressure of the accumulator 8 can be continuously maintained in the presence of the first one-way valve 32 in the floating control valve 3, so as to provide a stable standby pressure for the floating mechanism.

Embodiment 2

Figure 4:
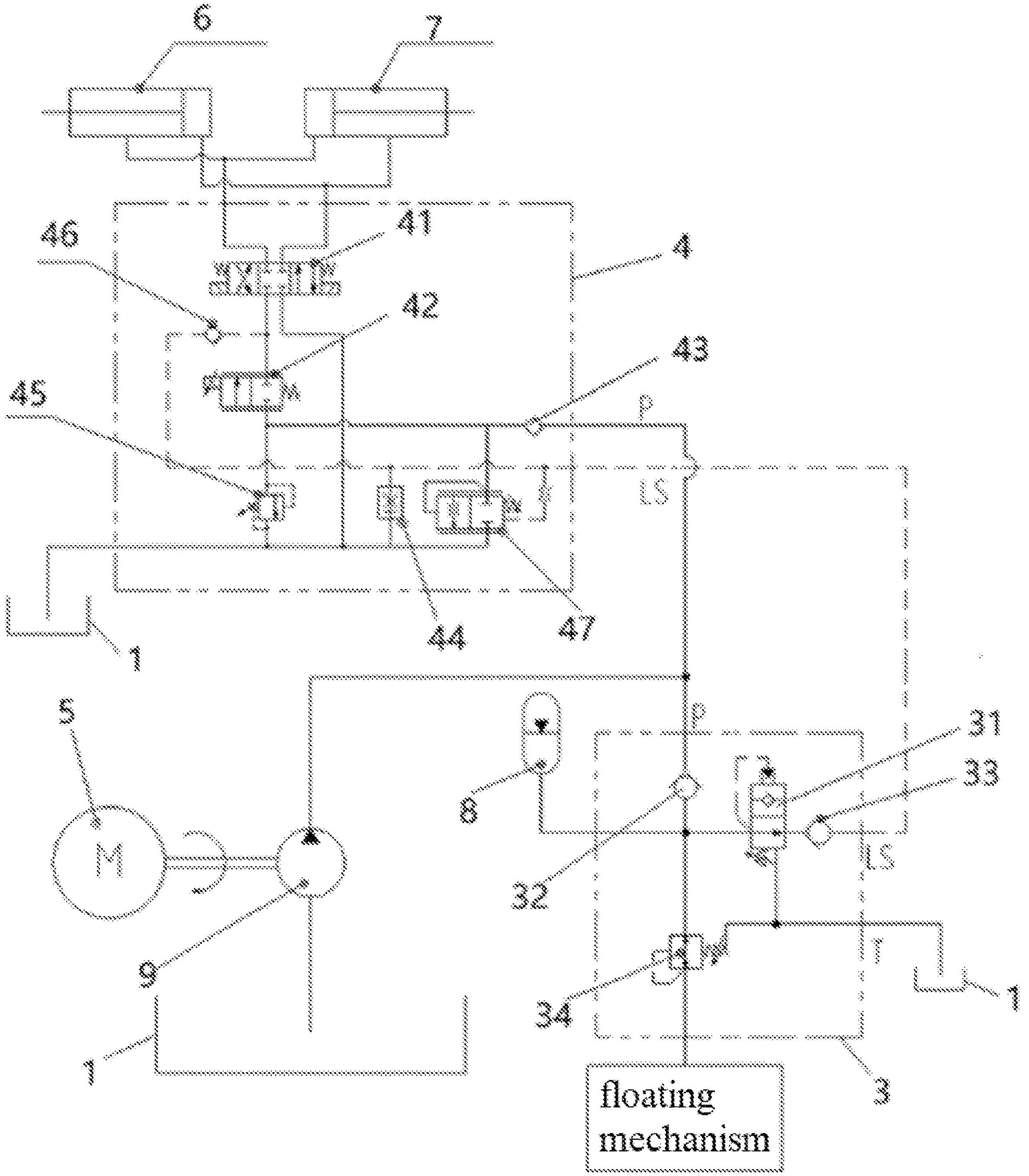
FIG. 4 is a schematic diagram of a floating control system in Embodiment 2 of the present invention.

As shown in FIG. 4, a floating control system provided in an embodiment of the present invention includes a driving mechanism 5, a hydraulic oil tank 1, a fixed displacement pump 9, a floating control valve 3, a floating mechanism, a boom function valve 4, an actuator, and an accumulator 8. The fixed displacement pump 9 is driven by the driving mechanism 5, an oil inlet of the fixed displacement pump 9 is connected to the hydraulic oil tank 1, an oil outlet of the fixed displacement pump 9 is connected to oil inlets of the floating control valve 3 and the boom function valve 4, and a feedback oil port LS of the floating control valve 3 and a feedback oil port LS of the boom function valve 4 are connected through a feedback oil path; the floating control valve 3 is connected to the accumulator 8, the floating mechanism, and the hydraulic oil tank 1; and the boom function valve 4 is connected to the actuator and the hydraulic oil tank 1. The floating control valve 3 includes a first one-way valve 32, a second one-way valve 33, a pressure reducing valve 34, and a logic valve 31; an oil inlet of the first one-way valve 32 serves as the oil inlet of the floating control valve 3, an oil outlet of the first one-way valve 32 is connected to a pipeline connecting the accumulator 8, an oil inlet of the pressure reducing valve 34 and an oil inlet of the logic valve 31, an oil outlet of the logic valve 31 is connected to an oil inlet of the second one-way valve 33, an oil outlet of the second one-way valve 33 serves as the feedback oil port LS of the floating control valve 3, an oil outlet of the pressure reducing valve 34 is connected to the floating mechanism, and the pipeline connecting the pressure reducing valve 34 and the logic valve 31 is also connected to the hydraulic oil tank 1.

The boom function valve 4 includes a change-over switch valve 41, a change-over proportional valve 42, a third one-way valve 43, a fourth one-way valve 46, an overflow valve 45, a two-way flow valve 44, and a three-way flow valve 47; an oil inlet of the third one-way valve 43 serves as the oil inlet of the boom function valve 4, and an oil outlet of the third one-way valve 43 is connected to a pipeline connecting an oil inlet of the change-over proportional valve 42, an oil inlet of the overflow valve 45 and the three-way flow valve 47; an oil outlet of the change-over proportional valve 42 is connected to a pipeline connecting an oil inlet of the fourth one-way valve 46 and an oil return port of the change-over switch valve 41, and an oil outlet of the overflow valve 45 is connected to a pipeline connecting an oil inlet of the change-over switch valve 41, the two-way flow valve 44, the three-way flow valve 47 and the hydraulic oil tank 1; an oil outlet of the fourth one-way valve 46 serves as the feedback oil port LS of the boom function valve 4, the two-way flow valve 44 and the three-way flow valve 47 are also connected to the feedback oil path, and pressure at the feedback oil port LS of the floating control valve 3 is fed back to a spring side of the three-way flow valve 47; and an oil outlet of the change-over switch valve 41 is connected to the actuator.

In this embodiment, the driving mechanism 5 is a motor. The actuator is a change-over cylinder, the change-over cylinder includes a left change-over cylinder 6 and a right change-over cylinder 7, and the left change-over cylinder 6 and the right change-over cylinder 7 are connected to the oil outlet of the change-over switch valve 41 respectively.

When the system is started, the motor drives the fixed displacement pump 9 to rotate, the oil outlet of the fixed displacement pump 9 outputs a certain flow rate of oil, and an oil output pressure of the fixed displacement pump 9 increases. Because the oil output pressure of the fixed displacement pump 9 is lower than a set pressure of the logic valve 31 at this moment, the oil output pressure of the fixed displacement pump 9 is fed back to the three-way flow valve 47 through the logic valve 31 and the feedback oil path. The three-way flow valve 47 cannot open for unloading under the actions of oil output pressure and feedback pressure, so the oil output pressure of the fixed displacement pump 9 continues to increase. When the oil output pressure of the fixed displacement pump 9 is greater than a nitrogen charging pressure of the accumulator 8, oil enters the accumulator 8 for energy storage, and the rate of increase in the oil output pressure decreases. When the accumulator 8 is filled with oil, the oil output pressure starts to rapidly increase again. When the oil output pressure reaches the set pressure of the logic valve 31, the logic valve 31 changes over its direction to cut off the oil outlet of the logic valve 31 and then to cut off the feedback oil path, the three-way flow valve 47 opens under the oil output pressure of the fixed displacement pump 9 to unload the hydraulic oil tank 1, and the fixed displacement pump 9 is in a standby pressure state.

In the presence of the first one-way valve 32 in the floating control valve 3, the oil in the accumulator 8 can be almost maintained at a maximum pressure before the oil outlet of the logic valve 31 is cut off, without releasing pressure. In this case, the accumulator 8 serves as a standby oil source for the floating mechanism, and continues to provide stable standby pressure for the floating mechanism.

When the floating mechanism consumes the oil in the accumulator 8 to decrease the oil pressure in the accumulator 8 to the set pressure of the logic valve 31, the logic valve 31 changes over its direction to open the oil outlet of the logic valve 31, the oil output pressure of the fixed displacement pump 9 is fed back to the three-way flow valve 47 through the logic valve 31 and the feedback oil path, and the unloading stops; and the oil output pressure of the fixed displacement pump 9 continues to replenish oil for the accumulator 8.

After the energy storage in the accumulator 8 is completed, the accumulator 8 provides a stable standby pressure for the floating mechanism, the fixed displacement pump 9 operates in a standby state with extremely low power consumption, and continuous constant pressure standby of the fixed displacement pump 9 is not required, so the power consumption is greatly reduced. Meanwhile, fully automatic floating control can be achieved by the system of the present invention, and any solenoid valve is not required to control the floating function, thereby greatly reducing hidden dangers caused by control signals, solenoid valves, and other factors and improving the reliability of the system.

Due to the parallel connection between the oil inlet of the floating control valve 3 and other actions (such as change-over, traveling, and braking), when the other actions are performed, the pressure at the oil inlet of the floating control valve 3 increases, and after the pressure exceeds the nitrogen charging pressure of the accumulator 8, oil is replenished to the accumulator 8. Meanwhile, the first one-way valve 32 and the pressure reducing valve 34 can directly provide pressure to the floating mechanism. After the actions stop, the oil pressure of the accumulator 8 can be continuously maintained in the presence of the first one-way valve 32 in the floating control valve 3, so as to provide a stable standby pressure for the floating mechanism.

Described above are merely specific implementations of the present invention, but the protection scope of the present invention is not limited thereto. Any skilled person who is familiar with this art could readily conceive of variations or modifications within the technical scope disclosed by the present invention, and these variations or modifications shall fall within the protection scope of the present invention.

The invention claimed is:

1. A floating control system, comprising a driving mechanism, a hydraulic oil tank, a variable displacement pump, a floating control valve, a floating mechanism, a boom function valve, and an actuator, wherein the variable displacement pump is driven by the driving mechanism, an oil inlet of the variable displacement pump is connected to the hydraulic oil tank, an oil outlet of the variable displacement pump is connected to oil inlets of the floating control valve and the boom function valve, a feedback oil port of the variable displacement pump is connected to feedback oil ports of the floating control valve and the boom function valve through feedback oil paths, the floating control valve is connected to the floating mechanism and the hydraulic oil tank, and the boom function valve is connected to the actuator and the hydraulic oil tank; characterized in that:

the system further comprises an accumulator, and the floating control valve comprises a first one-way valve, a second one-way valve, a pressure reducing valve, and a logic valve; and an oil inlet of the first one-way valve serves as the oil inlet of the floating control valve, an oil outlet of the first one-way valve is connected to a pipeline connecting the accumulator, an oil inlet of the pressure reducing valve and an oil inlet of the logic valve, an oil outlet of the logic valve is connected to an oil inlet of the second one-way valve, an oil outlet of the second one-way valve serves as a feedback oil port of the floating control valve, an oil outlet of the pressure reducing valve is connected to the floating mechanism, and the pipeline connecting the pressure reducing valve and the logic valve is also connected to the hydraulic oil tank.

2. The floating control system according to claim 1, characterized in that: the boom function valve comprises a change-over switch valve, a change-over proportional valve, a third one-way valve, a fourth one-way valve, an overflow valve, and a first unloading valve; an oil inlet of the third one-way valve serves as the oil inlet of the boom function valve, and an oil outlet of the third one-way valve is connected to a pipeline connecting an oil inlet of the change-over proportional valve and an oil inlet of the overflow valve; an oil outlet of the change-over proportional valve is connected to a pipeline connecting an oil inlet of the fourth one-way valve and an oil return port of the change-over switch valve, and an oil outlet of the overflow valve is connected to a pipeline connecting an oil inlet of the change-over switch valve, the first unloading valve and the hydraulic oil tank; an oil outlet of the fourth one-way valve serves as a feedback oil port of the boom function valve, and the first unloading valve is also connected to the feedback oil path; and an oil outlet of the change-over switch valve is connected to the actuator.

3. The floating control system according to claim 2, characterized in that: the first unloading valve is a two-way flow valve.

4. The floating control system according to claim 1, characterized in that: a pressure sensor for detecting oil output pressure is further arranged at the oil outlet of the variable displacement pump.

5. The floating control system according to claim 1, characterized in that: the actuator is a change-over cylinder, the change-over cylinder comprises a left change-over cylinder and a right change-over cylinder, and the left change-over cylinder and the right change-over cylinder are connected to the oil outlet of the change-over switch valve in the boom function valve respectively.

6. The floating control system according to claim 1, characterized in that: the driving mechanism is a motor.

7. A floating control system, comprising a driving mechanism, a hydraulic oil tank, a fixed displacement pump, a floating control valve, a floating mechanism, a boom function valve, and an actuator, wherein the fixed displacement pump is driven by the driving mechanism, an oil inlet of the fixed displacement pump is connected to the hydraulic oil tank, an oil outlet of the fixed displacement pump is connected to oil inlets of the floating control valve and the boom function valve, a feedback oil port of the floating control valve is connected to a feedback oil port of the boom function valve through a feedback oil path, the floating control valve is connected to the floating mechanism and the hydraulic oil tank, and the boom function valve is connected to the actuator and the hydraulic oil tank; characterized in that:

the system further comprises an accumulator, and the floating control valve comprises a first one-way valve, a second one-way valve, a pressure reducing valve, and a logic valve; and an oil inlet of the first one-way valve serves as the oil inlet of the floating control valve, an oil outlet of the first one-way valve is connected to a pipeline connecting the accumulator, an oil inlet of the pressure reducing valve and an oil inlet of the logic valve, an oil outlet of the logic valve is connected to an oil inlet of the second one-way valve, an oil outlet of the second one-way valve serves as the feedback oil port of the floating control valve, an oil outlet of the pressure reducing valve is connected to the floating mechanism, and the pipeline connecting the pressure reducing valve and the logic valve is also connected to the hydraulic oil tank.

8. The floating control system according to claim 7, characterized in that: the boom function valve comprises a change-over switch valve, a change-over proportional valve, a third one-way valve, a fourth one-way valve, an overflow valve, and a second unloading valve; an oil inlet of the third one-way valve serves as the oil inlet of the boom function valve, and an oil outlet of the third one-way valve is connected to a pipeline connecting an oil inlet of the change-over proportional valve, an oil inlet of the overflow valve and a first port of the second unloading valve; an oil outlet of the change-over proportional valve is connected to a pipeline connecting an oil inlet of the fourth one-way valve and an oil return port of the change-over switch valve, and an oil outlet of the overflow valve is connected to a pipeline connecting an oil inlet of the change-over switch valve, a third port of the second unloading valve and the hydraulic oil tank; an oil outlet of the fourth one-way valve serves as the feedback oil port of the boom function valve, and a second port and a fourth port of the second unloading valve are also connected to the feedback oil path; and an oil outlet of the change-over switch valve is connected to the actuator.

9. The floating control system according to claim 8, characterized in that: the second unloading valve comprises a two-way flow valve and a three-way flow valve, a first port of the three-way flow valve serves as the first port of the second unloading valve, a first port of the two-way flow valve serves as the second port of the second unloading valve, second ports of the two-way flow valve and the three-way flow valve serve as the third port of the second unloading valve, and a third port of the three-way flow valve serves as the fourth port of the second unloading valve.

10. An aerial work platform, characterized in that the aerial work platform comprises the floating control system according to claim 1.

11. The floating control system according to claim 2, characterized in that: a pressure sensor for detecting oil output pressure is further arranged at the oil outlet of the variable displacement pump.

12. The floating control system according to claim 3, characterized in that: a pressure sensor for detecting oil output pressure is further arranged at the oil outlet of the variable displacement pump.

13. The floating control system according to claim 2, characterized in that: the actuator is a change-over cylinder, the change-over cylinder comprises a left change-over cylinder and a right change-over cylinder, and the left change-over cylinder and the right change-over cylinder are connected to the oil outlet of the change-over switch valve in the boom function valve respectively.

14. The floating control system according to claim 3, characterized in that: the actuator is a change-over cylinder, the change-over cylinder comprises a left change-over cylinder and a right change-over cylinder, and the left change-over cylinder and the right change-over cylinder are connected to the oil outlet of the change-over switch valve in the boom function valve respectively.

15. The floating control system according to claim 2, characterized in that: the driving mechanism is a motor.

16. The floating control system according to claim 3, characterized in that: the driving mechanism is a motor.

17. An aerial work platform, characterized in that the aerial work platform comprises the floating control system according to claim 2.

18. An aerial work platform, characterized in that the aerial work platform comprises the floating control system according to claim 3.

19. An aerial work platform, characterized in that the aerial work platform comprises the floating control system according to claim 4.

20. An aerial work platform, characterized in that the aerial work platform comprises the floating control system according to claim 5.

* * * * *